United States Patent [19]

Akers et al.

[11] Patent Number: 4,752,226

[45] Date of Patent: Jun. 21, 1988

[54] CHEMICAL WARFARE SIMULATOR

[75] Inventors: Charles K. Akers; Roland J. Pilié, both of Williamsville; Clayton J. Schneider, Jr., East Aurora, all of N.Y.

[73] Assignee: Calspan Corporation, Buffalo, N.Y.

[21] Appl. No.: 43,914

[22] Filed: Apr. 29, 1987

[51] Int. Cl.⁴ ............................................. F41F 27/00
[52] U.S. Cl. ...................................... 434/11; 364/806
[58] Field of Search .................. 434/11, 218; 364/806

[56] References Cited

U.S. PATENT DOCUMENTS 3,035,772  5/1962  Hough et al. ...................... 364/806
3,558,865  1/1971  Berndt ................................. 434/11

FOREIGN PATENT DOCUMENTS 0209322  1/1987  Fed. Rep. of Germany ........ 434/11

Primary Examiner—Leo P. Picard
Attorney, Agent, or Firm—Biebel, French and Nauman

[57] ABSTRACT

A method and apparatus for simulating a chemical warfare attack includes the use of a radiant energy transmitting device for radiating energy in a pattern which simulates different types and forms of chemical agents. In its simplest embodiment, a signal strength above a predetermined level may represent a lethal dosage of the selected agent. Protective devices, such as gas masks, protective clothing, or structures, are provided with sensors for determining whether the protective device is properly employed. A receiver associated with each individual detects the presence and character of the radiated signal, and circuit means responsive to both the sensor and the output of the receiver provides an output indicating whether the individual has properly employed the protective device in a timely manner after a simulated chemical attack has been initiated.

14 Claims, 7 Drawing Sheets

FIG-2

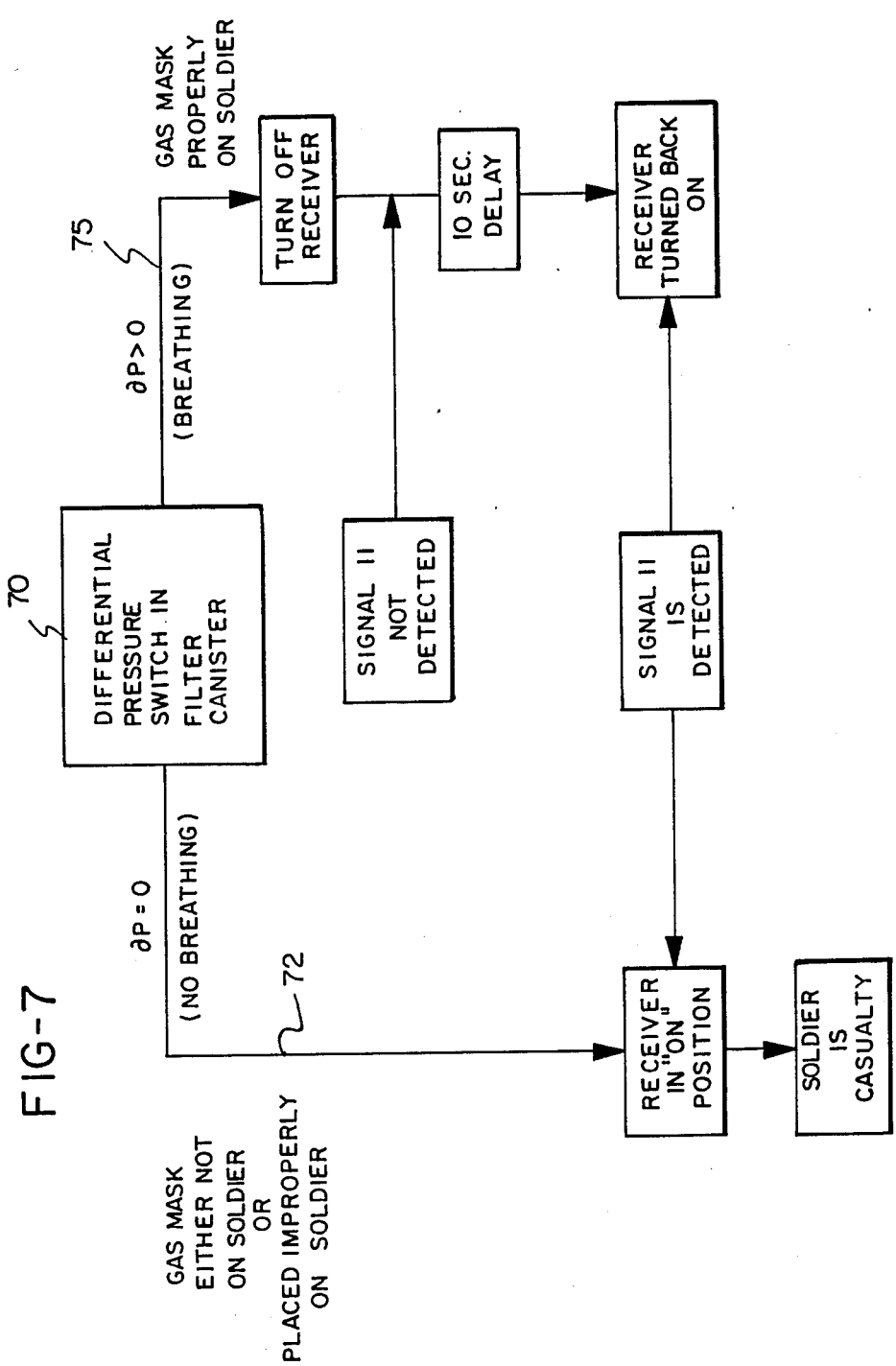

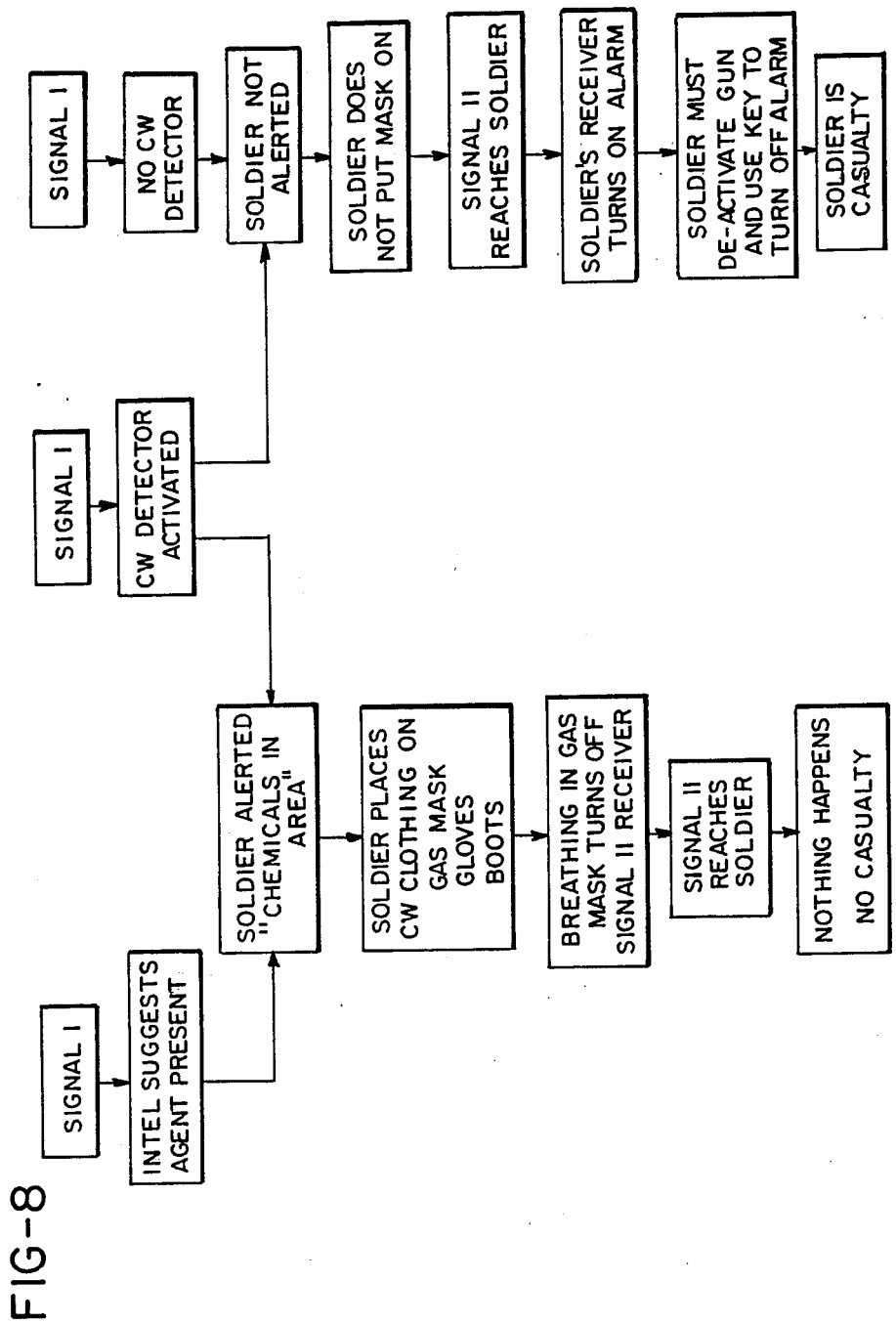

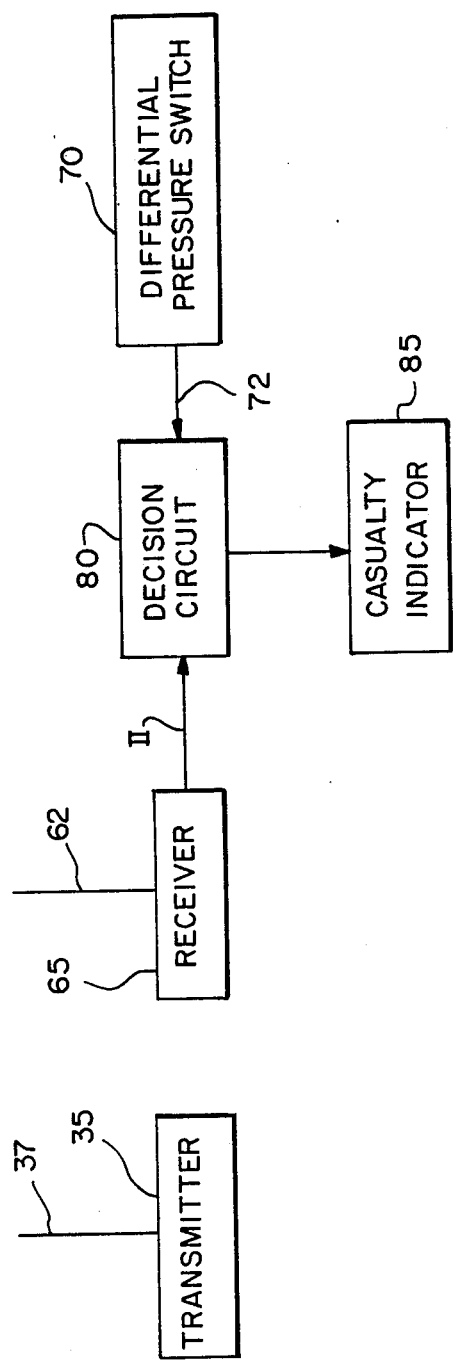

CHEMICAL WARFARE SIMULATOR

BACKGROUND OF THE INVENTION

This invention relates to an apparatus and a method of simulating a chemical warfare attack for use during field training. This invention can be used to simulate a vapor attack and/or a persistent agent contaminated surface.

One of the problems with chemical warfare simulations is the opportunity for the participants to ignore their own simulated demise or incapacitation, in other words, to cheat, and thus degrade the effectiveness of the exercise. Of course, it is not always practical or desirable to use substitute gases or agents; in some cases, such use might be dangerous, not only to the participants, but also to others not involved in the exercise. There are also limitations as to the number of substitute gases which might be used and have the same characteristics, and the expense of one-time use of substitute gases must also be taken into account.

SUMMARY OF THE INVENTION

This invention is a method and apparatus for accurately identifying those individuals, e.g. soldiers, who are truly a chemical warfare "casualty" by determining whether each has properly placed on their person the necessary protection equipment, such as a gas mask, protective clothing, etc., and to insure that the individual cannot defeat or cheat on the system.

This invention includes means for representing a source of the chemical agent, such as a radio, optical or infrared transmitter. There are several different types of agent characteristics that can be simulated or emulated by a properly designed transmitter.

Vapor. A vapor attack has the characteristic of starting at ground zero with minimal area coverage and then expanding due to diffusion as it is blown downwind. This can be duplicated by a transmitter carried by an airborne or any above-ground platform which projects a tightly focused beam toward ground zero at the time of the attack with the beamwidth being increased to make its projected cross-sectional area enlarge with time according to the agent's characteristics. The projected area of the radiated signal is moved downwind in accordance with the prevailing weather.

Liquid on the ground. A liquid agent having a low evaporation rate, when placed on the ground, acts as a secondary threat to be picked up as a soldier moves through a contaminated area. This characteristic may be duplicated by a transmitter located at ground zero which radiates omnidirectionally. Since a persistent agent has little associated vapor, there is no need to modify the radiated signal representing it in any way, either by time or in direction.

Evaporating liquid on the ground. A thickened agent concentrated in a small cross-sectional area that slowly evaporates will generate a vapor threat which will spread out and move downwind with the major concentration remaining fixed. This characteristic may be duplicated by locating a transmitter at a fixed position on the ground and by beaming a signal of increasing strength and beamwidth in the downwind direction.

Another element of the invention includes means for protecting an individual against a chemical agent such as gas during an attack. Typically, this would be a simple gas mask, but this invention also contemplates the use of other protective gear, such as vehicles, shelters, and protective suits. Examples of such gear are disclosed in U.S. Pat. Nos. 4,485,489, 4,485,490, 4,485,534 and 4,485,806, all of which are assigned to the assignee of this application, and the disclosures of which are incorporated herein by reference. A gas mask would be provided with sensor means to detect whether it is properly placed over the face of the individual soldier. The sensor means of this invention includes a pressure, temperature or resistive differential switch that is activated by the soldier's breathing to provide an electrical output indicating proper mask placement. Other comparable sensor devices would be necessary for apparel, vehicles and shelter to insure that they are properly configured to provide protection.

This invention is also provided with means for detecting the presence and other characteristics of the signals from the transmitter that simulates the chemical agent or gas source. This receiver may be located either in the soldier's mask, or placed at another location on his person, or, in the case of a vehicle or shelter, directly thereon. In a preferred embodiment of the invention, the strength or intensity of the radiated signals sensed by the receiver is used as an indication of the concentration of the chemical agent, but other characteristics of the signal could also be employed, such as pulse width modulation, frequency shifting, and other means to represent the type or types of agent, the distance from the source and concentration levels.

Circuit means responsive to outputs from both the receiver and the sensor means associated with the protective mechanism will indicate whether or not the affected party becomes a "casualty." This circuit is programmed to compare the type of chemical agent employed (as represented by one or more characteristics of the radiated signal), the time the protective equipment is properly installed, and the strength of the agent, and based on those factors, to provide an appropriate output.

Accordingly, it is an object of this invention to provide a method and apparatus for simulating a chemical warfare attack by using radiant energy transmitters to emulate the dispersion characteristics of the chemical agent or agents, sensor means on the protective equipment of the personnel to determine whether it is properly used, receivers associated with the personnel to sense the presence and character of the radiated signals at their location, and circuit means for determining whether any given individual is to be deemed a "casualty."

Other objects and advantages of this invention will be apparent from the following description, the accompanying drawings and the appended claims.

BRIEF DESCRIPTION OF THE DRAWINGS

FIG. 2 is a diagram showing the dispersion characteristics of the vapor chemical warfare agent used in FIG. 1.

FIG. 3 is a diagram showing the parameters and other information required to calculate the ground pattern for the dispersion characteristics of the chemical agent.

FIG. 7 is a flow chart showing the decision process for determining whether a soldier is a casualty.

FIG. 8 is a flow chart showing a similar decision process for determining whether a soldier is a casualty and for deactivating his weapon.

FIG. 9 is a simplified electrical block diagram of the decision making circuit of this invention.

DESCRIPTION OF THE PREFERRED EMBODIMENT

Figure 1:
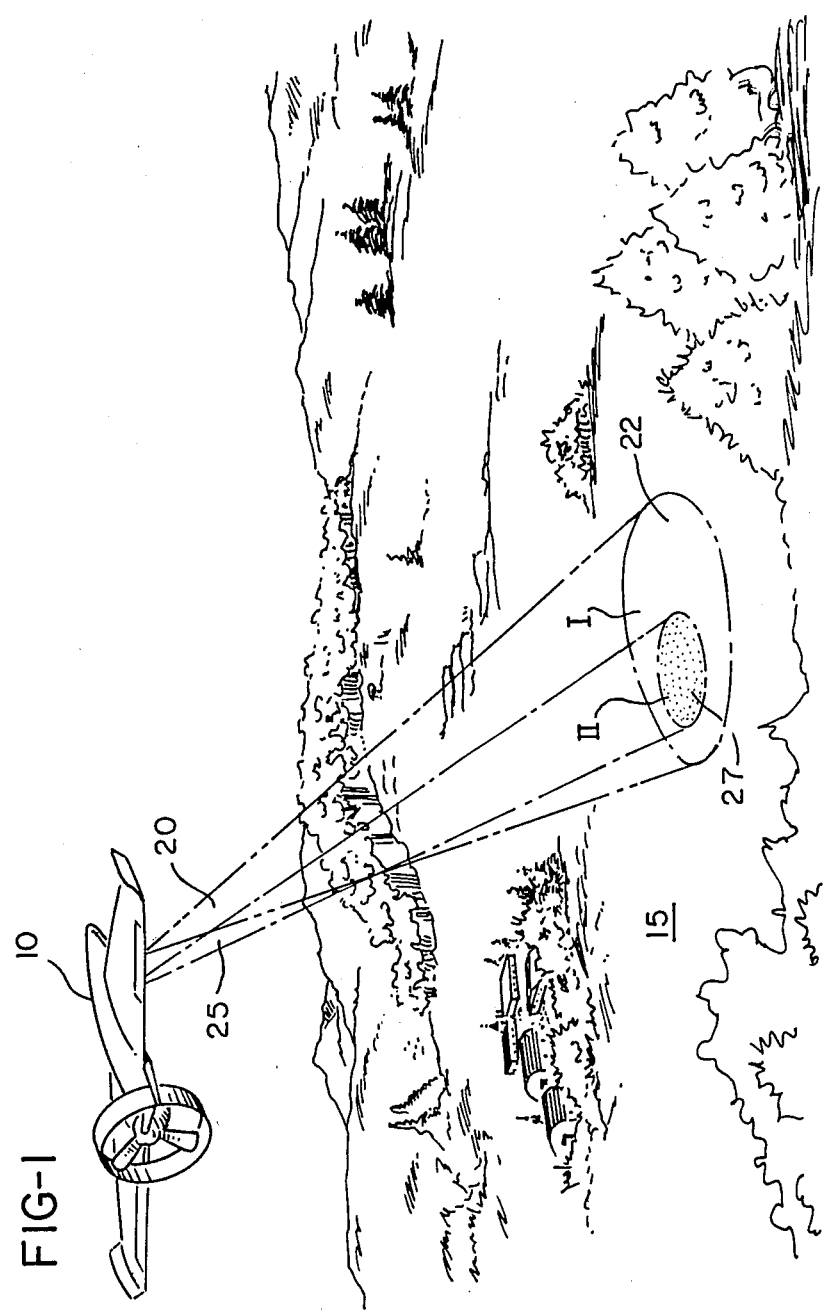
FIG. 1 is an aerial view showing an aircraft carrying a radiant energy transmitter directing a signal toward a battlefield to simulate the intensity of a chemical warfare agent in vapor form. Signal I represents agent concentrations that will activate chemical alarms. Signal II represents agent concentrations that will cause a chemical casualty if an individual is unprotected.
Figure 2:
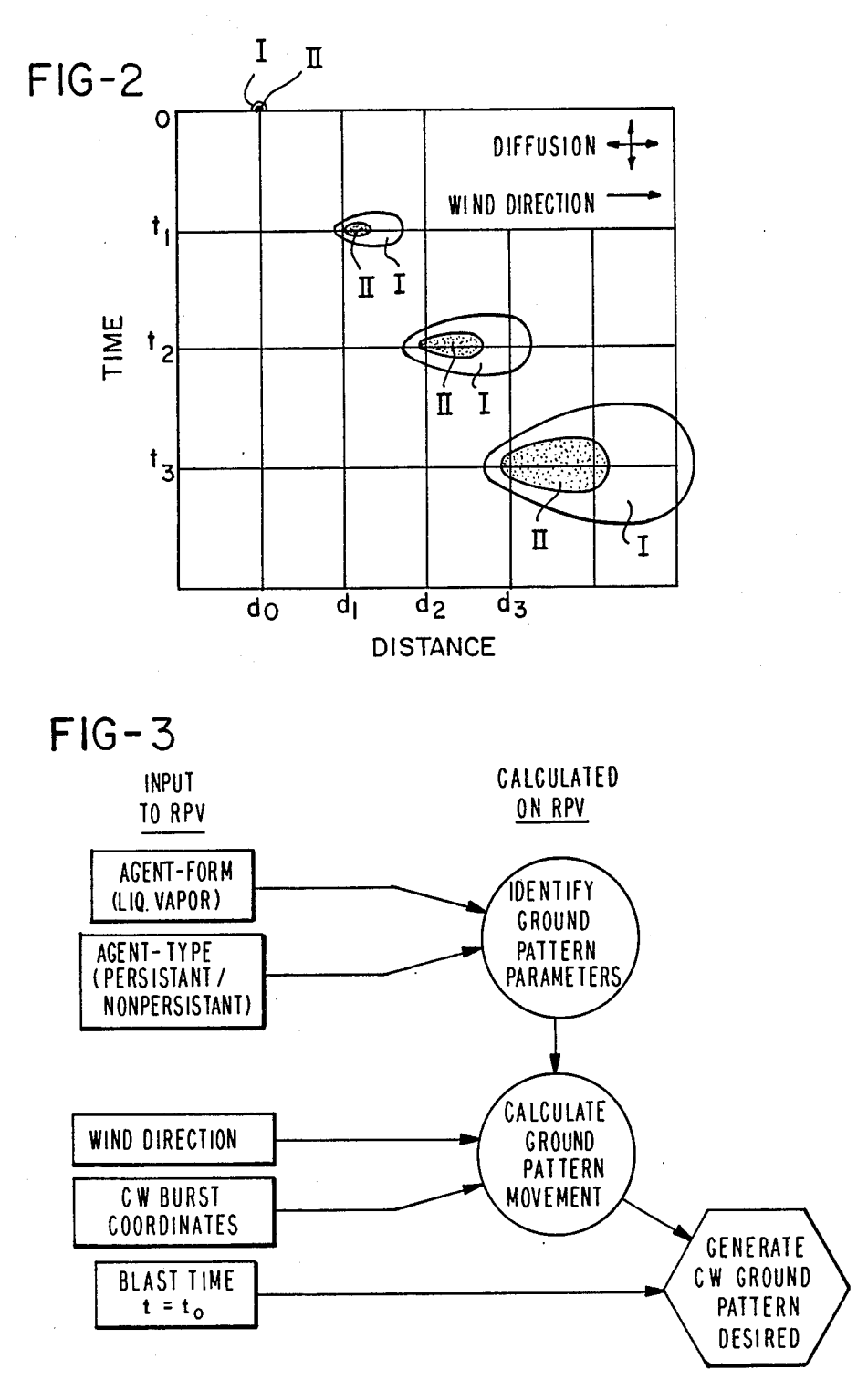
Figure 4:
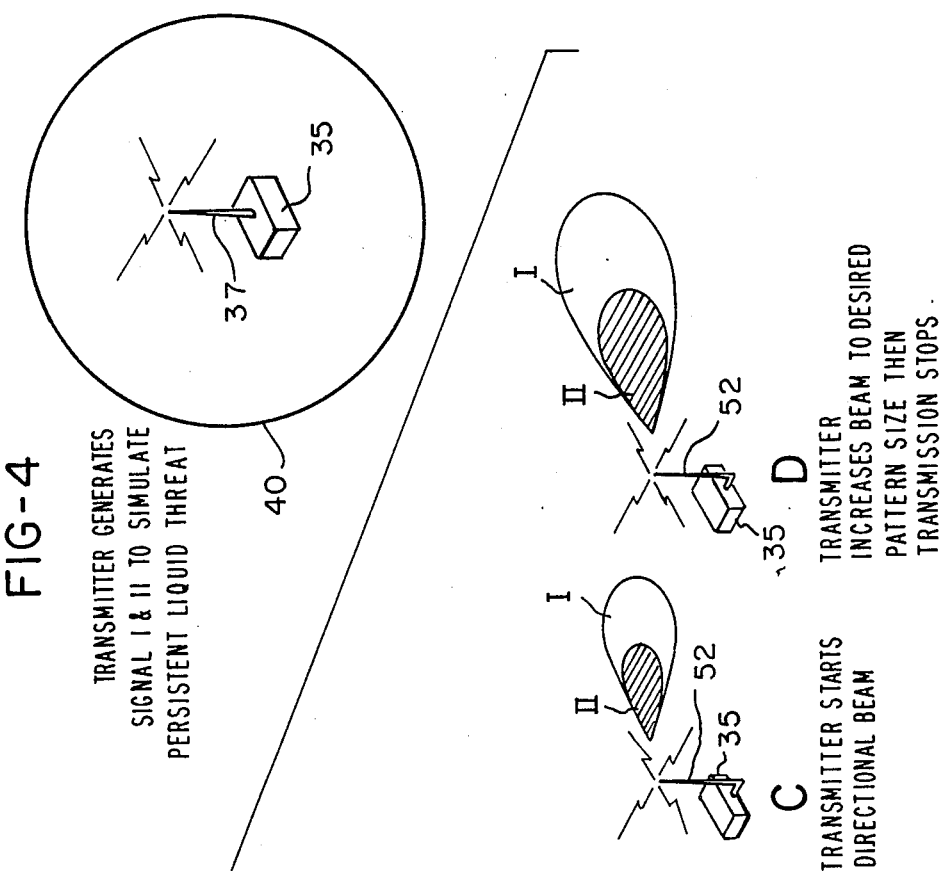
FIG. 4 is a diagram showing a fixed radio transmitter with an omnidirectional antenna for simulating a low evaporation rate liquid threat.
Figure 5:
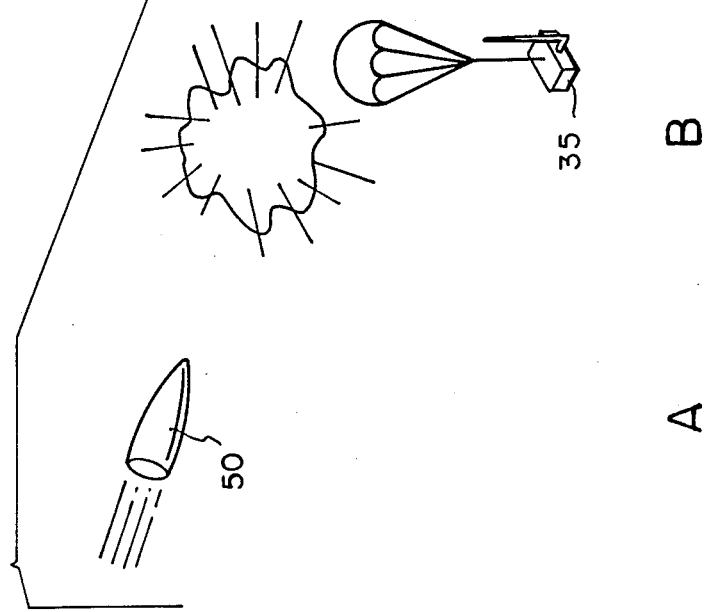
FIGS. 5A–5D are sequential drawings showing the deployment of a radio transmitter having a directional antenna to simulate an evaporating liquid on the ground.
Figure 6:
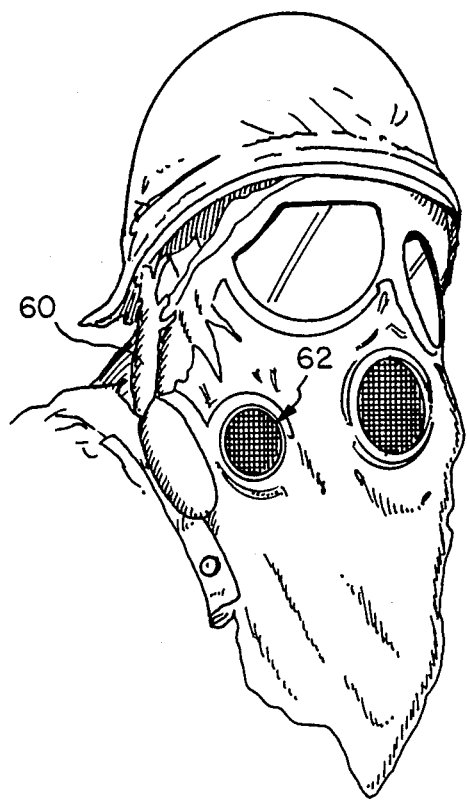
FIG. 6 is a view showing a typical gas mask having incorporated therein a radiant energy receiving device for detecting the presence of a simulated chemical agent.

Referring now to the drawings which illustrate a preferred embodiment of this invention, FIGS. 1–3 illustrate the technique for simulating a chemical warfare attack wherein a gas cloud or vapor is employed. A radiant energy transmitter, such as a radio frequency device, is carried by an aircraft 10 over a defined training area, such as battlefield 15. The aircraft may be a remotely piloted vehicle or drone, or it could be a manned aircraft or helicopter. The radiant energy transmitter is coupled to a pair of directional antennas that project beams of radiant energy of different intensities and of controlled beamwidth toward the battlefield. As shown in FIG. 1, a first antenna projects a well-defined beam 20 onto the ground having an intensity level I in the area 22. The other antenna projects second beam 25 of radio frequency energy onto the ground having an intensity level II in the area shown at 27. The aircraft preferably moves downwind to simulate the motion of the vapor cloud, with the area and intensities of the signals I and II varying as shown in FIG. 2. The above beams I and II may be generated from a fixed, above-ground platform.

As shown in FIG. 2, the intensity levels I and II are quite small at ground position D0 and time T0. These areas are made to become larger at times T1, T2 and T3 as the cloud moves downwind to locations D1, D2 and D3, respectively, by appropriate programming of the transmitter.

FIG. 3 illustrates the information needed to generate the desired ground pattern. The ground pattern parameters are a function of the form of chemical warfare agent, such as liquid or vapor, and its type, whether it is persistent or non-persistent. The ground pattern movement of the chosen agent is also a function of the wind direction and the ground coordinates where the vapor is to be released. This information, together with the time of the simulated attack, is then combined to generate a ground pattern program for controlling the beamwidth and intensity of the signals from the aircraft and the position of those signals on the ground, as illustrated in FIG. 2.

FIG. 4 shows a single transmitter 35 having an omnidirectional antenna 37 for representing a low evaporation rate liquid chemical agent placed on the ground. This type of agent has little associated vapor, so there would be no need to modify the radiated signal, either in time or direction, once the transmitter is activated. Any individual entering into the area defined by the circle 40 would be declared a casualty if protective clothing and equipment were not properly installed ahead of time.

Such a transmitter may be deployed in advance about the training area, and may be triggered into action by remote control devices, or by proximity detection devices which respond to the movement of personnel into the area of the transmitter, such as a "mine" which might eject a projectile or deploy an antenna.

FIGS. 5A-5D represent a system for simulating an evaporating liquid placed on the ground. As shown in FIG. 5A, a transmitter may be fired at the target area by means of a projectile 50 which opens above the ground and drops the transmitter 35 by means of a parachute (FIG. 5B). Alternatively, the transmitter could be merely placed on the ground and activated by a radio signal or a timer. The transmitter 35 is provided with a directional antenna 52 which is directed downwind. Since this device is used to simulate an evaporating liquid on the ground, the vapor threat will spread out from the area shown in FIG. 5C and move downwind while the major source of the agent remains at the fixed location represented by the transmitter, as illustrated in FIG. 5D. Accordingly, the beamwidth of the transmitted signal will gradually increase with time to simulate dispersion of the vapor. The transmitter 35 will be turned off after a predetermined period of time, thus indicating that the vapor is no longer a threat.

Since it may be expected that a chemical agent attack could involve coordinated use of two or more of the above-discussed agents, emulation of such a plurality of agents can be accomplished by using different transmitter frequencies or different types of electrical, audio, or optical transmissions (for example) to represent each of the different agents and their characteristics.

FIG. 6 represents one type of device for protecting an individual against a chemical agent, such as a typical gas mask 60. The gas mask would include radiant energy receiving means including an antenna 62 and receiver 65 where radio frequency signals are used. The mask would also be provided with some means for determining whether it has been properly installed, such as a differential pressure or temperature switch 70 (FIG. 9) in the filter cannister, which would be activated by the individual's breathing pattern to provide an output signal representing proper mask placement. The mask would also include circuit means 80 inside the gas filter cartridge which is responsive to both the differential pressure switch and the received signal for determining whether that particular individual might be classified as a casualty and for providing an output to an indicator 85.

FIG. 7 illustrates a flow chart for determining whether an individual is a casualty. If the differential pressure switch 70 inside the gas mask 60 indicates that the mask is either not on or is improperly placed on the individual, then there will be an output on line 72 to the decision circuit 80, and when a signal of intensity level II is detected, that device will be activated and an output therefrom will indicate that that particular person is a casualty. On the other hand, if the gas mask is properly installed, then an output will be provided on path 75, as shown on the right-hand branch in FIG. 7, and when the intensity level of the signal reaches level II, a lethal dosage, no action will be taken, and the individual may continue to operate and function normally.

FIG. 8 is similar to FIG. 7; but in this case, if a person is declared a casualty and he is armed, e.g. a soldier, then an alarm will be sounded, and the only way to disable the alarm is to use a MILES key which then deactivates the soldier's weapon. Not only is he a casualty, but his weapon is inoperative, and there is no question as to who may be permitted to continue to function in a simulated military exercise after a simulated chemical warfare attack.

Obviously, using radiant energy devices, such as radio frequency transmitters, audio devices or infrared devices, is safe and effective, and does not present the hazards that would be encountered in this type of exercise should any other type of chemical agent be used.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. Apparatus for determining whether an individual exposed to a simulated chemical warfare attack may be considered a survivor or a casualty comprising
   - means for representing a source of a chemical agent against which physical protection is required, said means including a radiant energy transmitter having a output that representing the characteristics of the agent;
   - means for physically protecting an individual against the chemical agent distributed during an attack;
   - sensor means for detecting whether said protecting means is properly placed on the individual;
   - means for detecting the presence and character of the signal from said transmitter at the location of the individual; and
   - circuit means responsive to said sensor means and to said detecting means for determining whether an individual has properly installed said protecting means in a timely manner after a simulated chemical agent attack has been initiated.

2. The apparatus of claim 1 wherein said transmitter is an airborne radiant energy transmitter having a directional output signal of variable beamwidth for projecting onto the ground a signal which moves downwind and which increases in area with time thereby to simulate an attack by a vapor chemical agent.

3. The apparatus of claim 1 wherein said transmitter is a radiant energy transmitter having a constant output signal and positioned on the ground to simulate a liquid chemical agent having a low evaporation rate.

4. The apparatus of claim 1 wherein said transmitter is a radiant energy transmitter having a directional output signal of variable beamwidth and strength that increases with time thereby to simulate a liquid chemical agent that slowly evaporates.

5. The apparatus of claim 1 wherein said protection means is a gas mask and wherein said sensor means is a pressure differential switch which provides an output indicating whether the mask is properly placed on the face of the individual.

6. The apparatus of claim 5 wherein said receiver means is located within said mask.

7. The apparatus of claim 1 wherein said receiver means includes means for sensing the signal strength of the radiated energy from said transmitter and for providing a first output representing received signal strength below a first predetermined magnitude, a second output representing received signal strength above the first predetermined magnitude, and a third output representing received signal strength above a second predetermined magnitude.

8. The apparatus of claim 7 wherein said circuit means further includes means to disable the output of said receiver means in response to an output from said sensor means and time delay means responsive to the the removal of said mask to reactivate said receiver means after a predetermined time delay.

9. The apparatus of claim 8 wherein said circuit means further includes an alarm to indicate "casualty" status whenever the receiver is activated and provides said third output representing a signal of greater than said second predetermined magnitude.

10. The apparatus of claim 1 further including wind direction sensor means for controlling the direction of the signal radiated from said transmitter.

11. Apparatus for determining, by response to radiation eminating from a radiant energy transmitter having an output that represents the characteristics of chemical warfare agents, whether an individual exposed to a simulated chemical warfare attack may be considered a survivor or a casualty, comprising
   - means for physically protecting an individual against the chemical agent distributed during an attack;
   - sensor means for detecting whether said protecting means is properly placed on the individual;
   - means for detecting the presence and character of the radiated signal at the location of the individual; and
   - circuit means responsive to said sensor means and to said detecting means for determining whether an individual has properly installed said protecting means in a timely manner after a simulated chemical agent attack has been initiated.

12. A method of simulating a chemical warfare attack against a plurality of military personnel operating in a defined training area, comprising the steps of
   - activating at least one radiant energy transmitter having an output signal representing the chemical agent used in the attack,
   - providing each individual with a device for protecting him from the chemical agent,
   - sensing whether the protecting device is properly installed on the individual,
   - sensing the strength and character of the radiant energy as received by the individual from said transmitter, and
   - declaring an individual a casualty if his protective device has not been properly installed in a timely manner after a chemical attack has been initiated.

13. The method of claim 12 further including the step of deactivating the individual's military weapons if he has been declared a casualty.

14. The method of claim 12 further comprising controlling the radiant energy transmitter to vary the intensity and/or the area of coverage according to a predicted migration and/or expansion of the chemical agent.

* * * * *